UNITED STATES PATENT OFFICE.

JAMES A. DEUTHER, OF BOSTON, MASSACHUSETTS, ASSIGNOR TO JOHN JOYCE, OF ANDOVER, MASSACHUSETTS.

PROCESS OF TREATING CALCIUM CARBID.

SPECIFICATION forming part of Letters Patent No. 615,816, dated December 13, 1898.

Application filed July 13, 1896. Serial No. 599,024. (No specimens.)

*To all whom it may concern:*

Be it known that I, JAMES A. DEUTHER, of Boston, in the county of Suffolk and State of Massachusetts, have invented certain new and useful Improvements in the Treatment of Calcium Carbid or Analogous Substances, (for which I have obtained certain patents as follows: French Letters Patent No. 259,911, dated September 22, 189 ; British Letters Patent No. 20,599, dated September 17, 1896; Belgian Letters Patent No. 123,642, of 1896, and Austrian Letters Patent No. 47,777, dated March 4, 1897,) of which the following is a specification.

This invention relates to certain new and useful improvements in the treatment of calcium carbid or analogous compounds to make the same of uniform composition.

By my process calcium carbid or analogous compounds, in whatever condition produced, either in crystalline form or as a mass, is first pulverized, and then a binding material which does not decompose the carbid is mixed therewith and has the purpose of binding the pulverized compound and also acts as an adulterant thereto, and said binding material also facilitates the process of making these more or less finely divided compounds coherent—that is, makes said compound less liable to fracture or pulverization in transportation or in use. There may be any number of substances which would act as a binding material in carrying out my invention; but I find that rosin is a very good material for this purpose. It is evident that if the said binding material acts to keep the above-mentioned compound in one piece, that if the said compound is delivered to the water or other liquid in one piece, naturally, if the said compound is decomposible by water or other liquid, then said decomposition will occur at a rate in proportion to which all the particles of the above-mentioned compound are brought into contact with the liquid which serves to decompose said compound.

In the processes now used which aim to produce calcium carbid a compound is produced composed of calcium carbid and impurities in more or less degree, "impurities" being defined as that which exists, say, in a pound of said product other than in the form of calcium carbid. In practical commercial operation it is found that the product resulting from the processes or methods now used to produce calcium carbid is not uniform, and by "uniform" I mean the capability of, say, one pound of product always to produce the same determined amount of gas. Now, practically illustrating, assuming the operation of producing calcium carbid has been carried on for one day, a mass is obtained, say, of one thousand pounds. Now it will be found that samples taken from different portions of this mass show that said mass is not a uniform compound—that is, said different portions do not all produce the same amount of gas. If the whole of said mass were decomposed, the resultant gas from the whole of said mass would be, say, for instance, three cubic feet per pound of said mass, while portions of said mass when taken separate may yield five cubic feet per pound of product, and another portion may yield three or four cubic feet per pound of product; but the whole of the mass when thoroughly mixed together is capable of an average yield of three cubic feet of gas per pound of product. Likewise on a second run a product may be obtained capable of yielding on an average two and one-half cubic feet of gas per pound or five cubic feet of gas, &c.

Now it is the purpose and object of my invention to take calcium carbid or compounds of an analogous nature, pulverize the same, and when pulverized or crushed mix the same thoroughly, so that if one thousand pounds of non-uniform calcium carbid is obtained from a run, now, when the same is crushed and thoroughly mixed every portion of this mixed mass will be uniform in the sense that one pound of product from any portion of said mass is capable of yielding the same determined amount of gas per pound. The binding material, which may be either a solid or a liquid, is useful to mix with said finely-divided product, so that when said product is compressed into tablets it will be more coherent and retain its tablet form. Having thus obtained a mass of uniform composition, it is obvious that if one pound of such uniform mass give, say, for instance, four cubic feet of gas when decomposed by water or other liquid then a certain weight of such uniform decomposable substance can be taken when in a powdered condition and compressed into tablets, each tablet representing by decomposition a definite amount of gas and when brought into contact with water or other liquid will generate a fixed amount of gas.

In another application, filed by me on the 13th day of July, 1896, Serial No. 599,025, I have shown, described, and claimed an apparatus in which a fixed amount of calcium carbid or analogous substance, preferably in tablet form, is fed to the gas-generating chamber containing either water or other liquid, and the feeding of said calcium carbid is automatically controlled by the pressure or volume of the gas generated.

What I claim as new, and desire to secure by Letters Patent of the United States, is—

1. As a new article of manufacture, a cartridge existing as a compact individual body, containing an inert substance and a metallic carbid, in a divided state, the particles of carbid being uniformly distributed through the cartridge or compact body at such intervals that some of said particles will lie in any plane cutting the compact body or cartridge.

2. As a new article, a cartridge existing as a compact individual body, containing an inert substance and a metallic carbid, in a divided state, the particles of said carbid being uniformly distributed through the cartridge or compact body at such intervals that some of said particles will lie in any plane cutting said compact body or cartridge, the inert substance having less affinity for water than the carbid, whereby the capillary attraction of the cartridge is reduced.

3. As a new article of manufacture, a cartridge containing, in a divided state, a metallic carbid, a bond by which its particles are held together, the whole forming a compact body, and the particles of said carbid being distributed through the bond at such intervals that some of said particles will lie in any plane cutting the cartridge or compact body.

4. As a new article of manufacture, a cartridge containing, in a divided state, calcium carbid, and a bond by which its particles are held together, the whole forming a compact body, said body being destructible by the action resulting from exposing the cartridge to water.

5. The process of generating acetylene gas at a regulated rate which consists in uniting divided metallic carbid with an inert binding material to form it into a body of uniform composition, and then subjecting the carbid so prepared to the action of water whereby the production of gas is retarded.

6. The herein-described process which consists, first, in mixing together metallic-carbid compounds of different compositions to produce a compound of uniform composition; second, in mixing with said compound an inert binding substance to make the same coherent, and third, in forming said compound into tablets which represent by decomposition a definite amount of gas.

7. The process of preparing a gas-producing substance which consists in crushing carbid of calcium or similar gas-producing substances, then mixing therewith a binding agent of greater imperviousness to water than the gas-producing substance, and then forming the resulting parts into compact bodies under pressure.

8. As a new article of manufacture, a compact body composed of comminuted carbid of calcium or similar gas-producing substances, and a binding agent mixed with said carbid and of greater imperviousness to water than the gas-producing substance.

In testimony whereof I have signed my name to this specification, in the presence of two subscribing witnesses, on this 27th day of May, A. D. 1896.

JAMES A. DEUTHER

Witnesses:
  A. LOUISE MESSER,
  E. L. HARLOW.